(12) United States Patent
Hersh (10) Patent No.: US 7,001,505 B2
(45) Date of Patent: Feb. 21, 2006

(54) SLURRY MONITORING SYSTEM

(75) Inventor: Lyle L. Hersh, Farmington, NM (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 271 days.

(21) Appl. No.: 10/136,934

(22) Filed: Apr. 30, 2002

(65) Prior Publication Data

US 2003/0201214 A1    Oct. 30, 2003

(51) Int. Cl.
*G01N 1/14* (2006.01)

(52) U.S. Cl. .................. 210/93; 210/108; 210/412; 210/414; 96/417; 73/863.23; 73/863.24

(58) Field of Classification Search .............. 210/106, 210/108, 412, 413, 414, 93, 96.1, 96.2; 95/281, 95/282, 278; 73/863.23; 96/417
See application file for complete search history.

(56) References Cited

U.S. PATENT DOCUMENTS

| | | | |
|---|---|---|---|
| 4,019,984 A * | 4/1977 | Mohn | 210/770 |
| 4,261,196 A * | 4/1981 | Scheid, Jr. | 73/32 R |
| 4,271,019 A * | 6/1981 | Galletti | 210/108 |
| 4,859,335 A * | 8/1989 | Whyte | 210/393 |
| 5,074,999 A * | 12/1991 | Drori | 210/143 |
| 5,512,167 A * | 4/1996 | Gramms et al. | 210/108 |
| 6,206,042 B1 * | 3/2001 | Channell et al. | 137/624.2 |
| 6,443,312 B1 * | 9/2002 | Racine | 210/355 |

FOREIGN PATENT DOCUMENTS

| | | | |
|---|---|---|---|
| EP | 455333 A2 | * | 11/1991 |
| GB | 2110553 A | * | 6/1983 |

* cited by examiner

Primary Examiner—Terry K. Cecil
(74) Attorney, Agent, or Firm—Lowell W. Gresham; Meschkow & Gresham (57) ABSTRACT

A slurry monitoring system is provided. A filter encompasses a filter chamber containing a purge piston. During a monitor operation, the purge piston is retracted, and slurry enters the filter chamber through the filter, then passes into an outlet pipe, where a characteristic of the slurry is monitored by a monitoring device. During a purge operation, a flush valve is opened to allow water to pass into the filter chamber through an inlet pipe. The purge piston is extended to force filtered slurry from the filter chamber. The water dilutes filtered slurry remaining in the filter chamber. The flush valve is then closed and the purge piston retracted. This forces diluted slurry to pass out of the filter. This purges the filter. Diluted slurry also passes into the outlet pipe, which purges the outlet pipe and monitoring device.

31 Claims, 7 Drawing Sheets

SLURRY MONITORING SYSTEM

TECHNICAL FIELD OF THE INVENTION

The present invention relates to the field of slurry monitors. More specifically, the present invention relates to the field of slurry monitors having self-purging capabilities.

BACKGROUND OF THE INVENTION

Typical applications for slurries are the scrubbing of facility exhausts. For example, the exhaust of a coal-fired facility would typically contain acidic flue gasses and fly ash. Both pose environmental problems.

The acidic flue gasses are predominantly sulfur dioxide ($SO_2$) and hydrogen chloride (HCl). These acidic flue gasses combine with moisture in the atmosphere to produce sulfuric and hydrochloric acids, which then precipitate as acid rain.

Fly ash is the finely divided residue that results from the combustion of ground or powdered coal. Fly ash is a pozzolan, i.e., a siliceous material which, in the presence of water, will chemically combine with calcium oxide (lime) to produce a cementitious material. If allowed to pass into the atmosphere, fly ash would precipitate, either directly or in combination with atmospheric moisture, and form clogging films, scums, and sediments.

To inhibit the environmental consequences of such an exhaust, it is desirable to remove acidic flue gasses and fly ash from the exhaust before releasing the exhaust into the atmosphere. This is done in a scrubbing process, typically with the use of a lime-based slurry.

Sulfur dioxide reacts with lime to form calcium sulfite, which can then be air-oxidized to form calcium sulfate dihydrate (gypsum):

Similarly, hydrogen chloride reacts with lime to form calcium chloride:

Fly ash combines with the lime in the slurry to form siliceous compounds having cementitious properties. Being cementitious, these compounds tend to agglutinate into masses within the slurry.

While removing the acidic gasses and fly ash from the exhaust, the scrubbing process contaminates the slurry. The byproducts of the scrubbing process, calcium sulfite, calcium sulfate dihydrate, calcium chloride, and various siliceous compounds, enter and become a part of the slurry. These byproducts may be removed from the slurry by various chemical and/or separation techniques known to those skilled in the art.

The slurry is typically recycled and refreshed for both environmental and fiscal considerations. This requires that characteristics of the slurry be adjusted appropriately.

There is, therefore, a need to control the characteristics of a lime-based slurry used in the scrubbing of the exhaust of a coal-fired facility. This is often accomplished by monitoring a desired characteristic either periodically or substantially continuously, and adjusting the slurry in response to this monitoring. For example, if the desired characteristic is slurry density and if monitoring indicates the slurry is too dense, then more water may be added. Similarly, if the monitoring indicates the slurry is insufficiently dense, then more lime may be added. Such adjustments, in conjunction with contaminant removal, allow a slurry to be used indefinitely, with minimal wastage of both the water and the lime.

In scrubbing the exhaust of a coal-fired facility, the acidic flue gasses and fly ash pass into the slurry. This results in a slurry that is acidic, abrasive, and lumpy, with some "lumps" (agglutinations of siliceous compounds from fly ash) attaining a significant size and mass.

The contaminated slurry attacks the structure used to contain it, especially when the slurry is in motion. The walls and piping containing the slurry are continuously eroded, abraded, and pounded by the slurry. This results in further contamination of the slurry by components of the containment structure. A typical slurry therefore may not only contain water and lime; but also sulfur dioxide, hydrogen chloride (hydrochloric acid), and fly ash directly from the exhaust; sulfuric acid, calcium sulfite, calcium sulfate dihydrate (gypsum), calcium chloride, and agglutinations of cementitious siliceous compounds as exhaust byproducts; and even metal fragments, fiberglass, pieces of concrete, rebar, and chevrons from the containment structure itself. This provides an extremely hostile environment into which to place a monitoring device (e.g., a density meter). Filters, filter housings, small-bore piping, and monitoring devices used in such an environment are often clogged, damaged, or destroyed by the contaminated slurry.

SUMMARY OF THE INVENTION

Accordingly, it is an advantage of the present invention that a slurry monitoring system is provided.

It is another advantage of the present invention that a slurry monitoring system is provided that incorporates both a monitor operation and a purge operation.

It is another advantage of the present invention that a slurry monitoring system is provided that, during a monitor operation, monitors a slurry characteristic through a filter chamber encompassed by a protected filter.

It is another advantage of the present invention that a slurry monitoring system is provided that, during a purge operation, purges a filter chamber and an encompassing filter.

It is another advantage of the present invention that a slurry monitoring system is provided that, during a purge operation, purges a monitoring device.

The above and other advantages of the present invention are carried out in one form by a slurry monitoring system configured to monitor a characteristic of a slurry. The system incorporates a base plate, a filter coupled to the base plate, a filter chamber encompassed by the filter and configured to contain a filtered slurry, a purge piston contained within the filter chamber, an outlet pipe coupled to the filter chamber and configured to pass the filtered slurry, and a monitoring device coupled into the outlet pipe and configured to monitor the desired characteristic of the filtered slurry.

The above and other advantages of the present invention are carried out in another form by a slurry monitoring method incorporating the activities of causing a slurry to flow through a slurry flow chamber into which a filter encompassing a filter chamber has been placed, maintaining a purge piston in a first position proximate a first end of the filter chamber for a first predetermined length of time to effect a monitor operation, extending the purge piston from the first position to a second position proximate a second end of the filter chamber to begin a purge operation, retaining the purge piston in the second position for a second predetermined length of time to effect the purge operation, and retracting the purge piston from the second position to the first position to terminate the purge operation.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
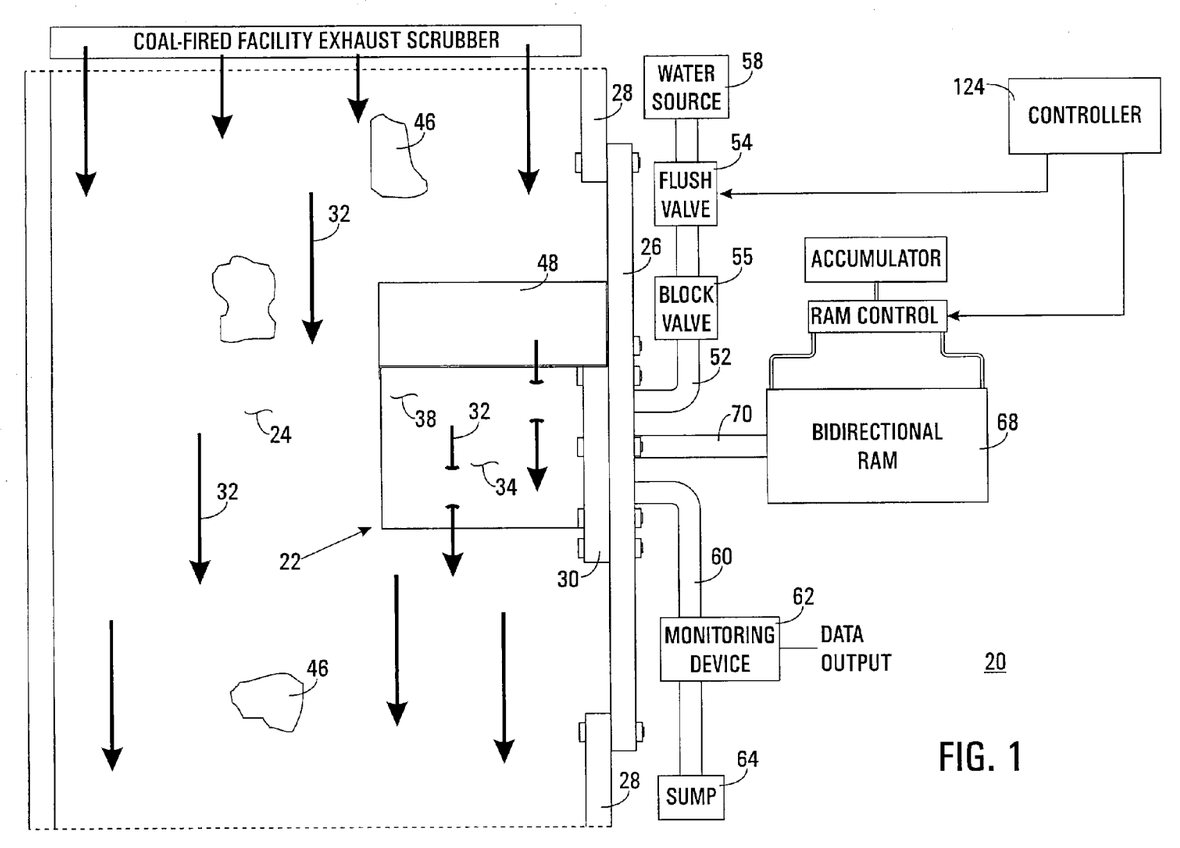
FIG. 1 shows a schematic view of a slurry monitoring system in accordance with a preferred embodiment of the present invention.
Figure 2:
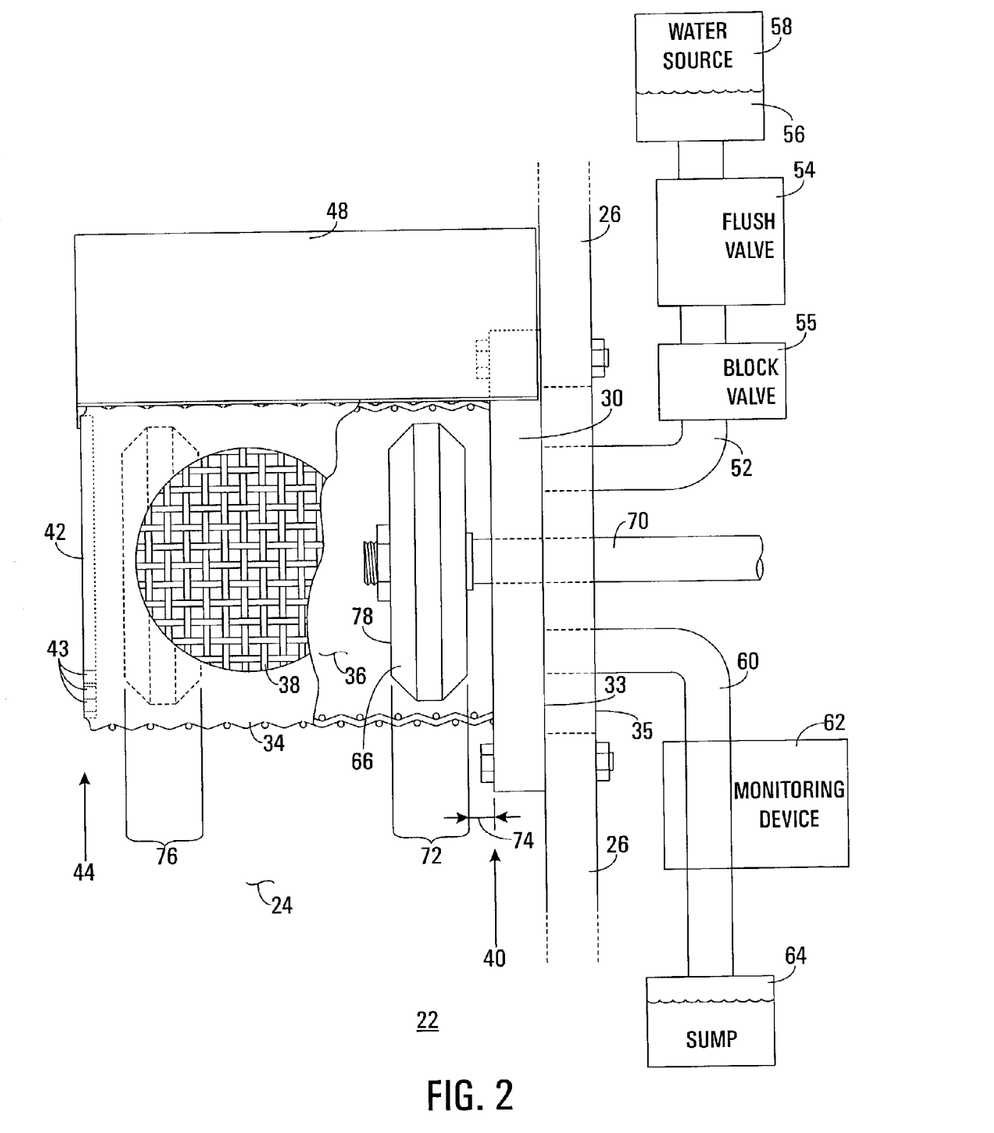
FIG. 2 shows a side view of a filtration unit for the system in FIG. 1 in accordance with a preferred embodiment of the present invention.
Figure 3:
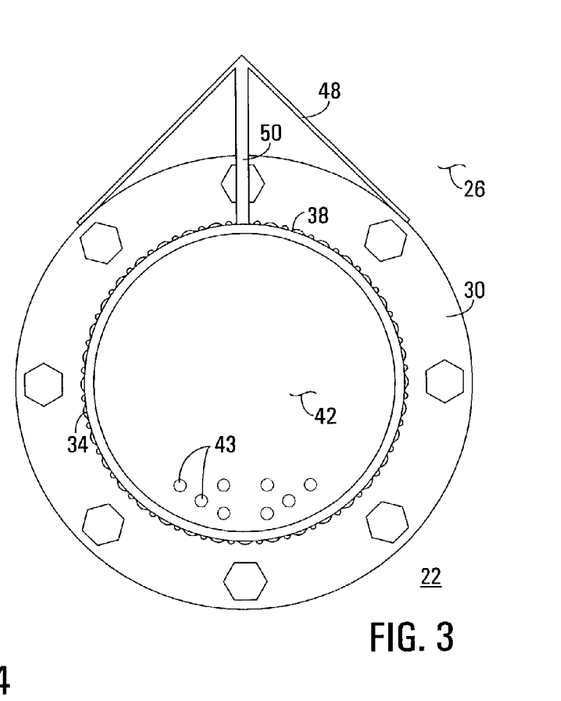
FIG. 3 shows an end view of the filtration unit of FIG. 2 in accordance with a preferred embodiment of the present invention.

In accordance with a preferred embodiment of the present invention, FIG. 1 shows a schematic view of a slurry monitoring system 20, and FIGS. 2 and 3 show a side view and an end view, respectively, of a filtration unit 22 for system 20. The following discussion refers to FIGS. 1, 2, and 3.

In the preferred embodiment, slurry monitoring system 20 is represented as monitoring the density of a lime-based slurry for use in scrubbing the exhaust of a coal-fired facility. Those skilled in the art will appreciate that the present invention may be used to monitor any desired characteristic of any slurry. The use of system 20 to monitor other than the density of a slurry, and/or the use of that slurry for other than the scrubbing of the exhaust of a coal-fired facility, does not depart from the spirit of the present invention.

FIG. 1 shows the basic components of slurry monitoring system 20. System 20 is made up of filtration unit 22 mounted within a slurry flow chamber 24. In the preferred embodiment, a mounting plate 26 is coupled to an opening in a wall 28 of flow chamber 24. Similarly, a base plate 30 of filtration unit 22 is coupled to an opening in mounting plate 26. Auxiliary components (discussed hereinafter) are also mounted to mounting plate 26 and/or base plate 30 using conventional techniques (not shown). In this manner, filtration unit 22 and auxiliary components may be removed from flow chamber 24 as a unit.

Those skilled in the art will appreciate that the method of mounting filtration unit 22 and auxiliary components to flow chamber 24 is not a part of the present invention. Other mounting methods may be used without departing from the spirit of the present invention.

Slurry flow chamber 24 may be of any desired form. In the preferred embodiment, flow chamber 24 is a portion of a conduit for a slurry 32, e.g., a 24" pipe.

Base plate 30 has a front side 33 and a back side 35 (FIG. 2). In the preferred embodiment, filtration unit 22 is made up of a filter 34 enclosing a filter chamber 36. Filter 34 is formed of a screen 38 coupled to front side 33 of base plate 34 at an inner end 40 of filter chamber 36, and an end plate 42 coupled to screen 38 at an outer end 44 of filter chamber 36. End plate 42 is pierced by a plurality of holes 43.

In the preferred embodiment, screen 38 is a woven metallic mesh. Those skilled in the art, however, will appreciate that this is not a requirement of the present invention. Screen 38 may assume other forms, e.g., a perforated metal sheet, without departing from the spirit of the present invention.

Slurry 32 is contaminated through use. That is, slurry 32 contains components other than the liquid and suspended solid matter making up slurry 32 in its unused condition. In the preferred embodiment, slurry 32 is a lime-based slurry used to scrub the exhaust of a coal-fired facility. This use results in slurry 32 being acidic, abrasive, and lumpy. Slurry 32 may contain not only water and calcium oxide (lime) from the original mix, but also sulfur dioxide, hydrogen chloride (hydrochloric acid), fly ash, sulfuric acid, calcium sulfite, calcium sulfate dihydrate (gypsum), calcium chloride, agglutinated siliceous compounds, pieces of concrete, fiberglass, metal fragments, rebar, and chevrons.

It is desirable that filter 34 be protected from slurry 32 as much as is practical. Slurry 32 is acidic, abrasive, and lumpy. Filter 34 is desirably protected against the acidity of slurry 32 through the use of acid-resistant materials. Filter 34 is desirably protected against the abrasiveness of slurry 32 through the use of materials of sufficient hardness and/or resilience to resist abrasion. Filter 34 is protected against the "lumpiness" of slurry 32 (i.e., against debris 46 within slurry 32) by debris shield 48.

Debris 46 can assume significant size and mass. Debris shield 48, therefore, is desirably positioned and of sufficient strength to ward off and protect filter 34 from direct impact by any debris 46 of a size and mass dangerous to filter 34. In the preferred embodiment, debris shield 48 is substantially a pair of metal plates forming an inverted "V" over filter 34. One end of debris shield 48 is affixed to base plate 30 in a conventional manner (e.g., by welding), and the other end of debris shield 48 is affixed to end plate 42 via a support member 50. Those skilled in the art will appreciate that the specific material, shape, and/or method of attachment of debris shield 48 is not germane, and that differing materials, shapes, and attachment methods may be employed without departing from the spirit of the present invention.

Filtration unit 22 includes an inlet pipe 52 containing a flush valve 54 and, optionally, a block valve 55. Inlet pipe 52 is configured to convey water 56 from a water source 58, through and under control of flush valve 54, through base plate 30, and into filter chamber 36.

Optional block valve 55 allows inlet pipe 52 to be closed for safety during maintenance and/or replacement of filtration unit 22. Those skilled in the art will appreciate that optional block valve 55 is not a requirement of the present invention, and is included as a safety measure in keeping with sound plumbing practices. The inclusion or exclusion of block valve 55 does not depart from the spirit of the present invention.

Filtration unit 22 also includes an outlet pipe 60 containing a monitoring device 62. Outlet pipe 60 is configured to convey a portion of slurry 32 from filter chamber 36, through base plate 30, through monitoring device 62, and to a sump 64. A desired characteristic of slurry 32 is monitored as slurry 32 passes through monitoring device 62.

In the preferred embodiment, monitoring device 62 is configured to monitor a density of slurry 32. Those skilled in the art will appreciate that this is not a limitation of the present invention. Monitoring device 62 may be configured to monitor another characteristic of slurry 32 (e.g., pH, opacity, etc.) without departing from the spirit of the present invention.

Within filter chamber 36, filtration unit 22 includes purge piston 66. In the preferred embodiment, purge piston 66 is coupled to a bidirectional ram 68 via a shaft 70, which passes through base plate 30. Purge piston 66 is therefore coupled to shaft 70 proximate front side 33 of base plate 30, and bidirectional ram 68 is coupled to shaft 70 proximate back side 35 of base plate 30.

Purge piston 66 is configured to reside in a retracted position 72 proximate inner end 40 of filter chamber 36 a predetermined distance 74 from base plate 30 during a monitor operation (discussed hereinafter), and to extend to, reside in, and retract from an extended position 76 position proximate outer end 44 of filter chamber 36 during a purge operation (discussed hereinafter).

Figure 4:
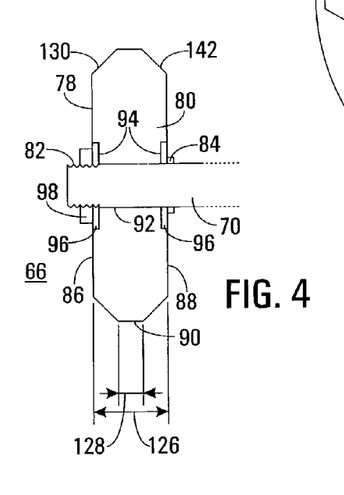
FIG. 4 shows a cross-sectional view of a purge piston for the filtration unit of FIG. 2 in accordance with a preferred embodiment of the present invention.

FIG. 4 shows a cross-sectional view of purge piston 66 for filtration unit 22 in accordance with a preferred embodiment of the present invention. The following discussion refers to FIGS. 1, 2, 3, and 4.

Fly ash is a pozzolan, and therefore cementitious within a lime-based slurry. Being cementitious, fly ash is both cohesive and adhesive. That is, fly ash tends not only to bond with itself to form ash masses, but also to cling to and coat the materials with which it comes in contact. Fly ash, therefore, tends to cling to and clog filter 34 and outlet pipe 60. This poses problems, which are addressed hereinafter in connection with the purge operation.

Fly ash also tends to cling to and coat purge piston 66. purge piston 66, when in retracted position 72, is distance 74 away from base plate 30 (discussed hereinafter). It is desirable that purge piston 66 not be coated with fly ash, lest distance 74 be reduced. Purge piston 66 is therefore desirably formed of (or has an outer surface 78 (FIG. 4) coated with) a non-metallic material 80 to which fly ash cannot easily adhere. Desirably, non-metallic material 80 is a polymeric material having a coefficient of friction of less than 0.3. In the preferred embodiment, purge piston 66 is formed of a single piece of polytetrafluoroethylene (PTFE).

Purge piston 66 may be fastened to shaft 70 in the manner demonstrated in FIG. 4. As depicted in FIG. 4, shaft 70 has a thread 82 at one end thereof. Proximate thread 82, shaft 70 has affixed thereto or machined therein a collar 84. Purge piston 66 is machined from a single piece of PTFE into a cylindrical disc having a front face 86, a back face 88, an edge surface 90, and a central hole 92 to receive shaft 70. Centered circular depressions 94 are machined into each of faces 86 and 88 to receive force washers 96. Purge piston 66 and force washers 96 are placed upon shaft 70 and seated at collar 84. Purge piston 66 and force washers 96 are secured in place by a shaft nut 98. Force washers 96 and shaft nut 98 may be formed of stainless steel or other suitable material, as may be shaft 70 itself.

Those skilled in the art will appreciate that other methods of fabricating purge piston 66 and affixing purge piston 66 to shaft 70 may be used without departing from the spirit of the present invention.

Figure 5:
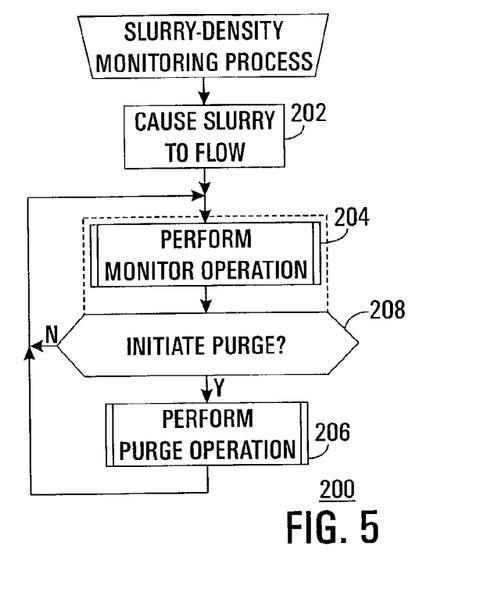
FIG. 5 shows a flow chart of a slurry monitoring process for use with the system of FIG. 1 in accordance with a preferred embodiment of the present invention.
Figure 6:
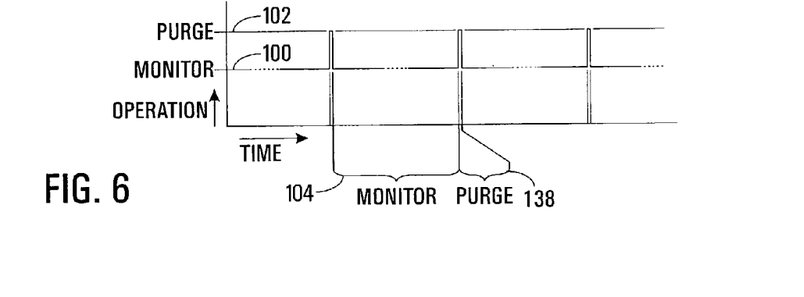
FIG. 6 shows a timing diagram of monitor and purge operations of the system of FIG. 1 in accordance with a preferred embodiment of the present invention.

FIG. 5 shows a flow chart of a slurry monitoring process 200 for use with system 20, and FIG. 6 shows a timing diagram of monitor and purge operations 100 and 102 of system 20 in accordance with a preferred embodiment of the present invention. The following discussion refers to FIGS. 1, 2, 5, and 6.

In system 20, slurry monitoring process 200 provides for the monitoring of a characteristic of slurry 32 during monitor operation 100, and for the purging of filter 34 and outlet pipe 60 during purge operation 102.

In a task 202, process 200 causes slurry 32 to flow through flow chamber 24 (FIG. 1). Task 202 may be effected by a pump (not shown), by gravity, or by other functions of scrubbing the exhaust of a coal-fired facility.

Process 200 has two subprocesses, perform monitor operation 204 and perform purge operation 206. In monitor-operation subprocess 204, the desired characteristic of slurry 32 is monitored. In purge-operation subprocess 206, filter 34 and outlet pipe 60 are flushed and purged. Subprocesses 204 and 206 are repeated indefinitely in a closed loop.

At any time during monitor-operation subprocess 204 a query task 208 may be used to initiate purge-operation subprocess 206. Query task 208 may be in response to a manual action (e.g., the pressing of a button), timed action (e.g., a timer closes a switch), or automatic action (in response to a computer or other device). When query task 208 is affirmative, monitor-operation subprocess 204 is terminated and control immediately passes to purge-operation subprocess 206.

Figure 7:
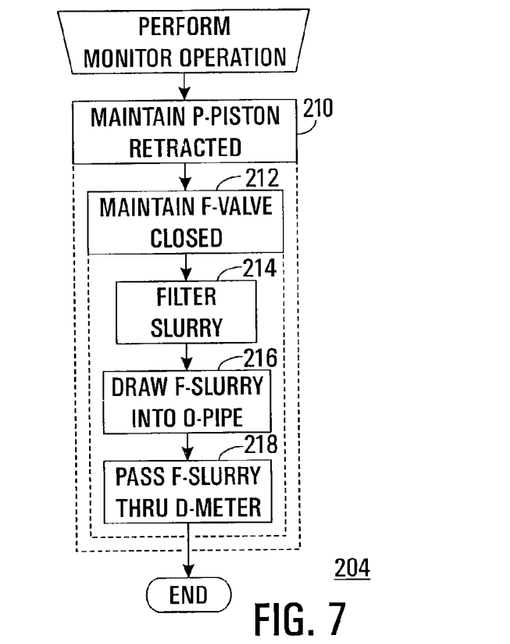
FIG. 7 shows a flow chart of a monitor-operation subprocess of the process of FIG. 5 in accordance with a preferred embodiment of the present invention.
Figure 8:
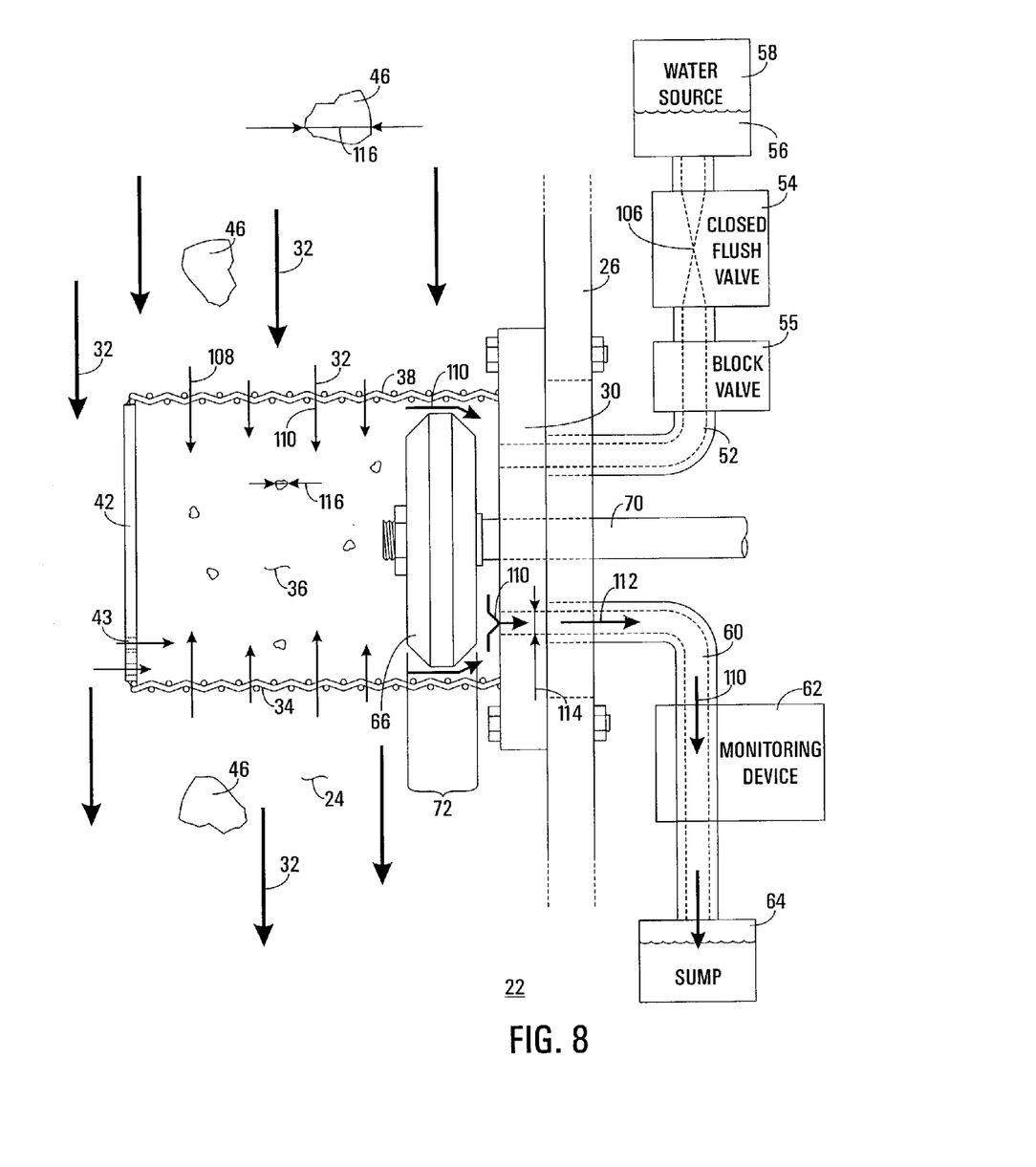
FIG. 8 shows a side view of the filtration unit of FIG. 2 with the filter cut away to demonstrate the monitor operation in accordance with a preferred embodiment of the present invention.

FIG. 7 shows a flow chart of monitor-operation subprocess 204 of process 200, and FIG. 8 shows a side view of filtration unit 22 with filter 34 cut away to demonstrate monitor operation 100 in accordance with a preferred embodiment of the present invention. The following discussion refers to FIGS. 1, 5, 6, 7 and 8.

A pseudotask 210 of monitor-operation subprocess 204 maintains purge piston 66 (FIG. 8) in retracted position 72 for a duration of a monitor time 104 (FIG. 6). Similarly, a pseudotask 212 maintains flush valve 54 in closed condition 106 for the duration of monitor time 104.

In the preferred embodiment, pseudotasks 210 and 212 are effected by refraining from doing a positive action. For example, prior to pseudotask 210, purge piston 66 is in retracted position 72. Pseudotask 210, therefore, consists of not doing anything to change the position of purge piston 66. Those skilled in the art will appreciate that pseudotasks 210 and 212 may be active tasks, i.e., may require a positive action, in other embodiments (not shown). The use of such other embodiments does not depart from the spirit of the present invention.

In a task 214, a portion 108 of slurry 32 is filtered by filtration unit 22 to become filtered slurry 110. In task 214, slurry 32 passes from flow chamber 24, through filter 34, and into filter chamber 36.

Then in a task 216, a portion 112 of filtered slurry (F-SLURRY) 110 is drawn into outlet pipe (O-PIPE) 60. This portion 112 of filtered slurry 110 passes through monitoring device 62 in a task 218, where the desired characteristic of filtered slurry 110 is monitored.

Outlet pipe 60 has a predetermined inner diameter 114. Filter 34 is desirably configured so that debris 46 within slurry 32 having a diameter 116 greater than one-half the predetermined outlet-pipe inner diameter 114 is blocked. Filtered slurry 110, therefore, should contain no debris 46 having a diameter 116 greater than one-half the inner diameter 114 of outlet pipe 60. This significantly decreases the possibility of having a debris jam within outlet pipe 60.

For this same reason, predetermined distance 74 between purge piston 66 and base plate 30 is equal to or greater than inner diameter 114 of outlet pipe 60.

Pseudotasks 210 and 212 are executed for the duration of monitor time 104. Tasks 214, 216, and 218 are performed substantially continuously during pseudotasks 210 and 212, i.e., for the duration of monitor time 104. Monitor time 104 is significantly greater than purge time 138 (see FIG. 6). The relationship between monitor and purge times 104 and 138 is discussed in more detail hereinafter.

This completes monitor-operation subprocess 204, and control is returned to process 200 (FIG. 1).

Figure 9:
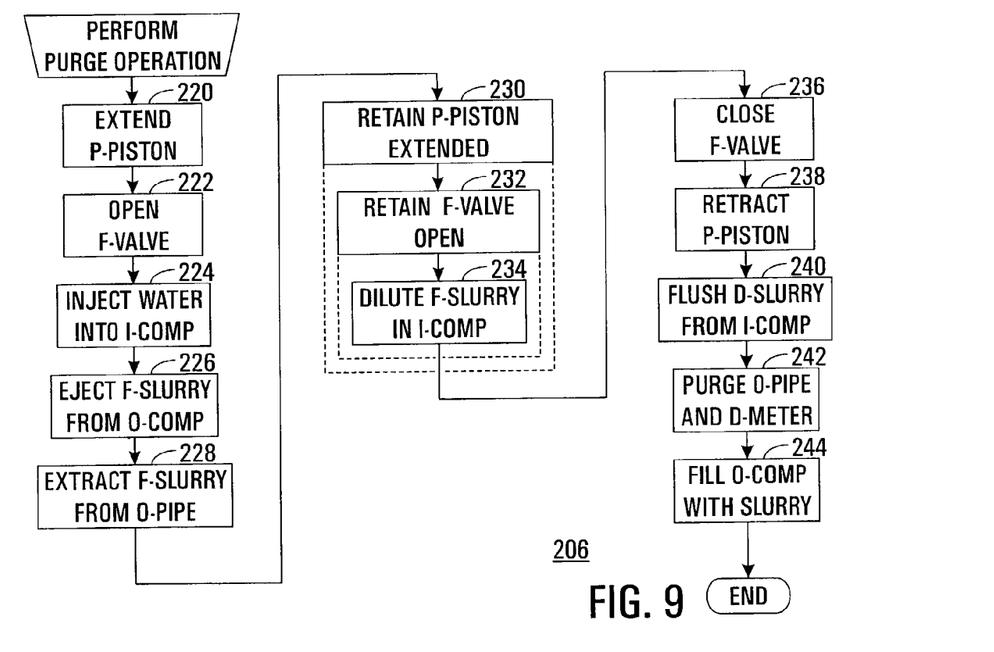
FIG. 9 shows a flow chart of a purge-operation subprocess of the process of FIG. 5 in accordance with a preferred embodiment of the present invention.
Figure 10:
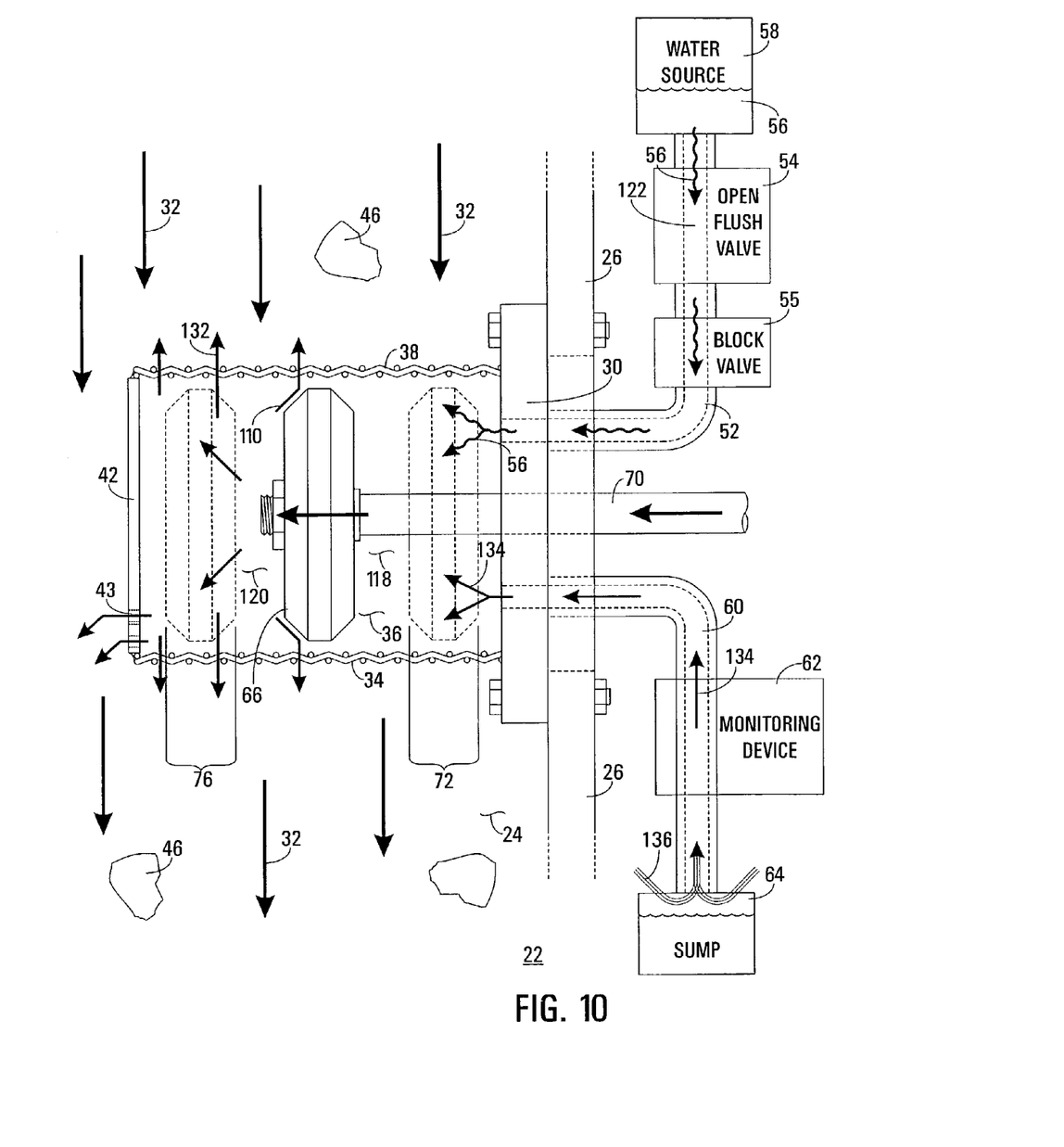
FIG. 10 shows a side view of the filtration unit of FIG. 2 with the filter cut away to demonstrate the purge operation during an outward stroke of the purge piston in accordance with a preferred embodiment of the present invention.
Figure 11:
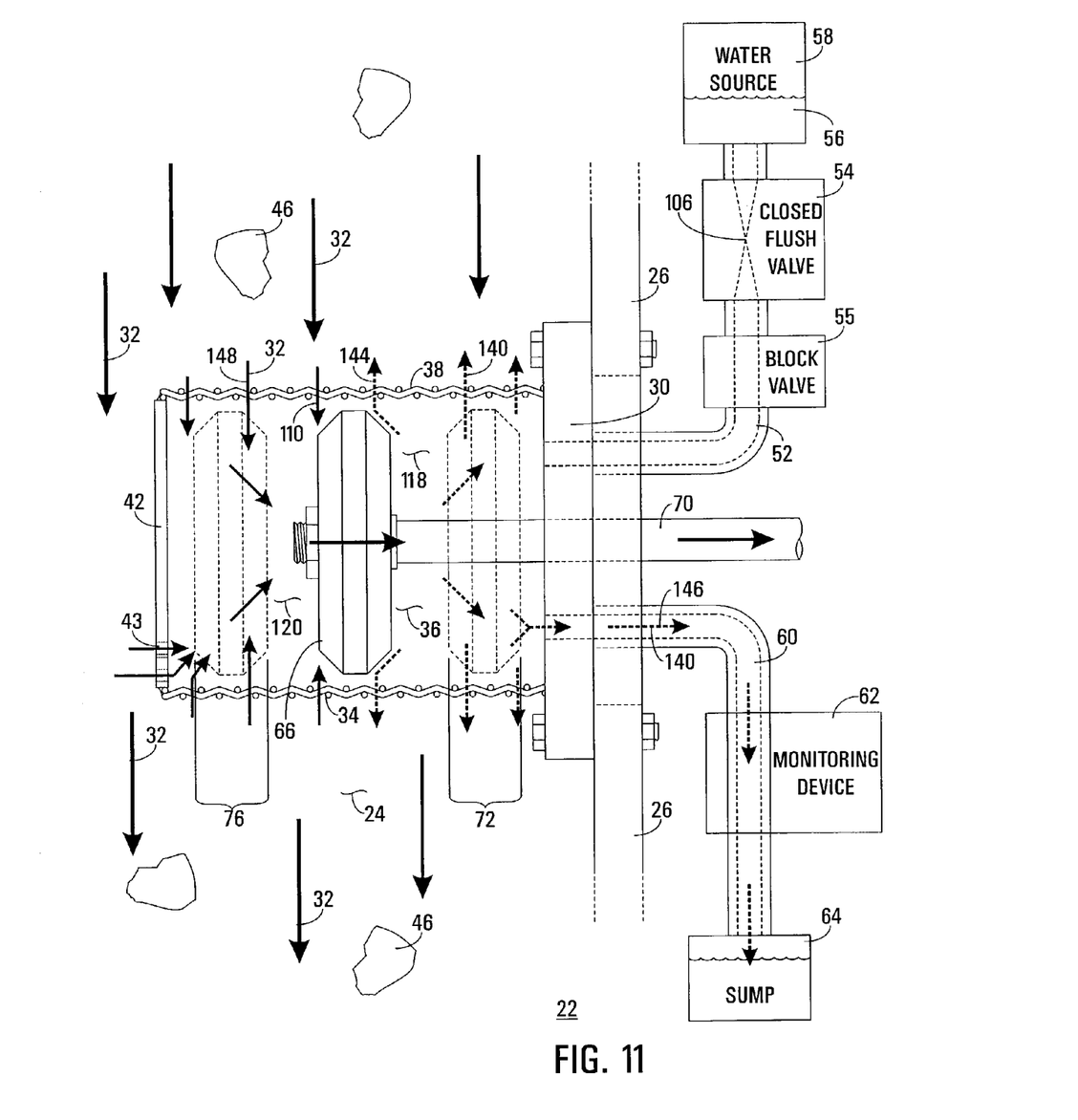
FIG. 11 shows a side view of the filtration unit of FIG. 2 with the filter cut away to demonstrate the purge operation during an inward stroke of the purge piston in accordance with a preferred embodiment of the present invention.

FIG. 9 shows a flow chart of purge-operation subprocess 206 of process 200, and FIGS. 10 and 11 show a side view of filtration unit 22 with filter 34 cut away to demonstrate purge operation 102 during an outward stroke (FIG. 10) and an inward stroke (FIG. 11) of purge piston 66 in accordance with a preferred embodiment of the present invention. The following discussion refers to FIGS. 1, 5, 6, 9, 10, and 11.

To better describe purge operation 102, filter chamber 36 may be thought of as being made up of two compartments. An inner compartment 118 is that portion of filter chamber 36 between base plate 30 and purge piston 66. An outer compartment 120 is that portion of filter chamber 36 between purge piston 66 and end plate 42. The relative sizes of inner and outer compartments 118 and 120 therefore depends the position of purge piston 66 within filter chamber 36.

A task 220 of purge-operation subprocess 206 begins purge operation 102 by rapidly extending purge piston (P-PISTON) 66 from retracted position 72 to extended position 76. This causes inner compartment 118 to rapidly increase in volume while causing outer compartment 120 to rapidly decrease in volume.

Substantially simultaneously, a task 222 opens flush valve 54, i.e., changes flush valve 54 from closed condition 106 (FIG. 8) to open condition 122 (FIG. 10).

Those skilled in the art will appreciate that the order in which tasks 220 and 222 are effected is not germane to the present invention. A reversal of the order of operations from that described herein does not depart from the spirit of the present invention.

A controller 124 is configured to cause bidirectional ram 68 to transit purge piston 66 between retracted and extended positions 72 and 76. Controller 124 is also configured to cause flush valve 54 to assume open and closed conditions 102 and 106 (FIGS. 10 and 11). Tasks 220 and 222 are accomplished in response to controller 124 (FIG. 1). Those skilled in the art will appreciate that controller 124 may be implemented in any convenient manner of which those skilled in the art may be cognizant. Typical implementations of controller 124 may include a simple manually operated switch, a timed switch, or a computer with a suitable program.

With flush valve 54 in open condition 122, a task 224 injects water 56 into inner compartment (I-COMP) 118 of filter chamber 36. That is, water passes from water source 58, through inlet pipe 52, and into filter chamber 36. Task 224 continues as long as flush valve 54 remains in open condition 122.

Purge piston 66 has a thickness 126 equal to the distance between front and back faces 86 and 88 (FIG. 4) proximate shaft 70, or proximate force washers 96 if force washers 96 are used. Desirably, thickness 126 is a maximum thickness 126, with the thickness of purge piston 66 radially tapering to a minimum thickness 128 at edge surface 90. In the preferred embodiment, this tapering is effected in part by a front chamfer 130 (FIG. 4) between front face 86 and edge surface 90. Desirably, front chamfer 130 subtends an angle of 45° (±10°) relative to front face 86.

As purge piston 66 transits from retracted position 72 to extended position 76 (FIG. 10), outer compartment 120 rapidly decreases in volume. Compression effects increase the pressure of filtered slurry 110 within outer compartment 120. This increase in pressure causes a portion 132 of filtered slurry 110 to be ejected from outer compartment (O-COMP) 120 through filter 34 and through holes #43 in end plate 42 in a task 226. This causes much of debris 46 clinging to filter 34 to become dislodged. Additionally, front chamfer 130 (FIG. 4) works with the compression effects to accelerate and direct filtered slurry 110 out of outer compartment 120 in a shear field (not shown) to further dislodge debris 46.

In normal operation, a portion of filtered slurry 110 accumulates in a lower portion of filter 34. Holes 43 in end plate 42 facilitate an in-line ejection of this accumulated filtered slurry 110 during task 226.

Also, as purge piston 66 transits from retracted position 72 to extended position 76, inner compartment 118 rapidly increases in volume. Expansion effects decrease the pressure of filtered slurry 110 within inner compartment 118. This decrease in pressure causes a portion 134 of filtered slurry 110 within outlet pipe 60 to be extracted back into inner compartment 118 of filter chamber 36 in a task 228. Debris 46 is thereby removed from outlet pipe 60. Desirably, outlet pipe 60 is configured to allow air 136 to enter outlet pipe 60, thereby permitting substantially all of filtered slurry 110 within outlet pipe 60 and monitoring device 62 to be extracted back into inner compartment 118.

Following tasks 220 and 222, a pseudotask 230 of purge-operation subprocess 206 retains purge piston 66 in retracted position 72 for a duration of a purge time 138 (FIG. 6). Similarly, a pseudotask 232 retains flush valve 54 in open condition 122 for the duration of purge time 138.

In the preferred embodiment, pseudotasks 230 and 232 are effected by refraining from doing a positive action. For example, prior to pseudotask 230, purge piston 66 is moved to extended position 72 by task 220. Pseudotask 230, therefore, consists of not doing anything to change the position of purge piston 66. Those skilled in the art will appreciate that pseudotasks 230 and 232 may be active tasks, i.e., may require a positive action, in other embodiments (not shown). The use of such other embodiments does not depart from the spirit of the present invention.

Flush valve 54 remains in open condition 122 for purge time 138, i.e., throughout pseudotasks 230 and 232. Water 56 continues to pass from water source 58, through inlet pipe 52, and into inner compartment 118 for the duration of purge time 138. This effects a task 234 to dilute filtered slurry 110 in inner compartment 118 into diluted slurry 140. At the end of purge time 138, diluted slurry 140 is desirably mostly water.

Monitor time 104 (see FIG. 6) is the time during which system 20 monitors the desired characteristic of slurry 32. Purge time 138 is substantially the time during which system 20 interrupts the monitoring of the desired characteristic of slurry 32 to purge filter 34, outlet pipe 60, and monitoring device 62. Desirably, monitor time 104 is significantly greater than purge time 138. In the preferred embodiment, i.e., where system 20 is used to monitor the density of a lime-based slurry 32 used in the scrubbing of the exhaust of a coal-fired facility, a monitor time 104 of least 1 and no more than 48 hours with a purge time 138 of at least 1.5 and no more than 5 seconds has been found to be satisfactory. Desirably, where controller 124 (FIG. 1) is automatic, monitor time 104 is 8 (±1) hours and purge time is 3 (+1, −0.5) seconds.

Following pseudotasks 230 and 232, a task 236 of purge-operation subprocess 206 terminates (i.e., finishes) purge operation 102 by rapidly retracting purge piston 66 from extended position 76 to retracted position 72. This causes inner compartment 118 to rapidly decrease in volume while causing outer compartment 120 to rapidly increase in volume.

Substantially simultaneously, a task 238 closes flush valve 54, i.e., changes flush valve 54 from open condition 122 to closed condition 106. With flush valve 54 in closed condition 106, the flow of water 56 from water source 58, through inlet pipe, and into filter chamber 36 is curtailed.

As with tasks 220 and 222, tasks 236 and 238 are accomplished in response to controller 124. Those skilled in the art will appreciate that the order in which tasks 236 and 238 are effected is not germane to the present invention. A reversal of the order of operations from that described herein does not depart from the spirit of the present invention.

In the preferred embodiment, purge piston 66 has a back chamfer 142 (FIG. 4) in addition to front chamfer 130 (FIG. 4). Back chamfer 142 exists between back face 88 (FIG. 4) and edge surface 90. Desirably, back chamfer 142 subtends an angle of 45° (±10°) relative to back face 88.

As purge piston 66 transits from extended position 76 to retracted position 72, inner compartment 118 rapidly decreases in volume. Compression effects increase the pressure of diluted slurry 140 within inner compartment 118. This increase in pressure causes a portion 144 of diluted slurry (D-SLURRY) 140 to be flushed from inner compartment (I-COMP) 118 through filter 34 in a task 240. This causes further debris 46 clinging to the outside of filter 34 to become dislodged. Additionally, back chamfer 142 (FIG. 4) works with the compression effects to accelerate and direct diluted slurry 140 out of inner compartment 118 in a shear field (not shown) to further dislodge debris 46.

Also, the increase in pressure within inner compartment 118 causes a portion 146 of diluted slurry 140 within inner compartment 118 to pass through outlet pipe 60 and monitoring device 62 in a task 242. Task 242 substantially flushes and purges outlet pipe 60 and monitoring device 62 thereby.

Additionally, as purge piston 66 transits from extended position 76 to retracted position 72, outer compartment 120 rapidly increases in volume. Expansion effects decrease the pressure within outer compartment 120. This decrease in pressure causes a portion 148 of slurry 110 within flow chamber 24 to be drawn into outer compartment 120 of filter chamber 36 in a task 244. Task 244 therefor fills outer compartment 120 with filtered slurry 110 preparatory to returning to monitor operation 100.

In summary, the present invention teaches a slurry monitoring system 20 and a process 200 therefor. System 20 incorporates both a monitor operation 100 and a purge operation 102 in process 200. During monitor operation 100 of system 20, process 200 uses a monitoring device 62 to monitor the density of a slurry 32 through a filter chamber 36 encompassed by a protected filter 34. During purge operation 102 of system 20, process 200 purges filter chamber 36, filter 34, and monitoring device 62.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A slurry monitoring system configured to monitor a characteristic of a slurry flowing through a slurry flow chamber, said system comprising:
    a base plate coupled to a wall of said slurry flow chamber;
    a filter having pores of a predetermined diameter coupled to said base plate, configured to extract a portion of said slurry flowing through said slurry flow chamber, configured to filter said portion of said slurry to produce a filtered slurry with debris having a diameter less than or equal to said predetermined diameter, and configured to pass a first portion of said filtered slurry back to said slurry flow chamber;
    a filter chamber encompassed by said filter and configured to contain said filtered slurry;
    an outlet pipe having an inner diameter substantially twice said predetermined diameter, coupled to said filter chamber, and configured to pass a second portion of said filtered slurry; and
    a monitoring device coupled into said outlet pipe and configured to monitor said characteristic of said second portion of said filtered slurry.

2. A slurry monitoring system as claimed in claim 1 wherein said monitoring device is configured to monitor a density of said second portion of said filtered slurry.

3. A slurry monitoring system as claimed in claim 1 wherein said filter is configured to block debris from entering said filter chamber when said debris has a diameter greater than one-half of said inner diameter of said outlet pipe.

4. A slurry monitoring system as claimed in claim 1 wherein said filter comprises:
    a screen encompassing said filter chamber and coupled to said base plate at a first end of said filter chamber; and
    an end plate coupled to said screen at a second end of said filter chamber.

5. A slurry monitoring system as claimed in claim 1 additionally comprising:
    a purge piston contained within said filter chamber;
    a shaft coupled to said purge piston within said filter chamber; and
    a bidirectional ram coupled to said shaft without said filter chamber.

6. A slurry monitoring system as claimed in claim 5 wherein:
    said filter chamber has a first end proximate to said base plate, and has a second end;
    said bidirectional ram is configured to cause said purge piston to reside in a first position proximate said first end; and said bidirectional ram is additionally configured to cause said purge piston to reside in a second position proximate said second end.

7. A slurry monitoring system as claimed in claim 6 additionally comprising a controller configured to cause said bidirectional ram to transit said purge piston between said first and second positions.

8. A slurry monitoring system as claimed in claim 1 additionally comprising:
   an inlet pipe coupled to said filter chamber; and
   a flush valve coupled into said inlet pipe and configured to control a flow of water into said filter chamber.

9. A slurry monitoring system as claimed in claim 8 additionally comprising a controller configured to cause said flush valve to assume one of an open condition and a closed condition.

10. A slurry monitoring system as claimed in claim 8 wherein said inlet pipe is coupled to said filter chamber through said base plate.

11. A slurry monitoring system configured to monitor a characteristic of a slurry, wherein said slurry is configured to scrub an exhaust of a coal-fired facility, wherein said slurry contains debris in the form of large and small ash particles, abraded cladding, and other materials, and wherein said system comprises:
   a base plate;
   a filter coupled to said base plate;
   a debris shield configured to protect said filter from said debris;
   a filter chamber encompassed by said filter and configured to contain a filtered slurry;
   a purge piston contained within said filter chamber;
   an outlet pipe coupled to said filter chamber and configured to pass said filtered slurry; and
   a monitoring device coupled into said outlet pipe and configured to monitor said characteristic of said filtered slurry.

12. A slurry monitoring system as claimed in claim 1 wherein said filter comprises a screen.

13. A slurry monitoring system as claimed in claim 12 wherein said screen is a wire mesh.

14. A slurry monitoring system configured to monitor a characteristic of a slurry, said system comprising:
   a base plate;
   a filter coupled to said base plate wherein said filter comprises:
      a screen encompassing said filter chamber and coupled to said base plate at a first end of said filter chamber; and
      an end plate coupled to said screen at a second end of said filter chamber and comprising a plurality of holes;
   a filter chamber encompassed by said filter and configured to contain a filtered slurry;
   a purge piston contained within said filter chamber;
   an outlet pipe coupled to said filter chamber and configured to pass said filtered slurry; and
   a monitoring device coupled into said outlet pipe and configured to monitor said characteristic of said filtered slurry.

15. A slurry monitoring system configured to monitor a characteristic of a slurry, said system comprising:
   a base plate;
   a filter having pores of a predetermined diameter coupled to said base plate and configured to filter a portion of said slurry to produce a filtered slurry with debris having a diameter less than or equal to said predetermined diameter;
   a filter chamber encompassed by said filter and configured to contain said filtered slurry;
   a purge piston contained within said filter chamber and comprises:
      a first face;
      a second face opposing said first face; and
      an edge surface between said first and second faces, wherein each of said first and second faces tapers towards said edge surface;
   an outlet pipe having an inner diameter substantially twice said predetermined diameter, coupled to said filter chamber, and configured to pass said filtered slurry; and
   a monitoring device coupled into said outlet pipe and configured to monitor said characteristic of said filtered slurry.

16. A slurry monitoring system as claimed in claim 15 wherein said edge surface comprises a chamfer between each of said first and second faces and said edge surface.

17. A slurry monitoring system as claimed in claim 16 wherein said chamfer is substantially 45°±10°.

18. A slurry monitoring system configured to monitor a characteristic of a slurry, said system comprising:
   a base plate;
   a filter having pores of a predetermined diameter coupled to said base plate and configured to filter a portion of said slurry to produce a filtered slurry with debris having a diameter less than or equal to said predetermined diameter;
   a filter chamber encompassed by said filter and configured to contain said filtered slurry;
   a purge piston is contained within said filter chamber and comprises:
      a first face;
      a second face opposing said first face; and
      an edge surface between said first and second faces, wherein said first face, said second face, and said edge surface together comprise an outer surface formed of a nonmetallic material;
   an outlet pipe having an inner diameter substantially twice said predetermined diameter, coupled to said filter chamber, and configured to pass said filtered slurry; and
   a monitoring device coupled into said outlet pipe and configured to monitor said characteristic of said filtered slurry.

19. A slurry monitoring system as claimed in claim 18 wherein said nonmetallic material is a polymeric material having a coefficient of friction of less than 0.3.

20. A slurry monitoring system as claimed in claim 18 wherein said nonmetallic material is polytetrafluoroethylene.

21. A slurry-density monitoring system configured to monitor a density of a slurry flowing through a slurry flow chamber during a monitor operation, and configured to self purge during a purge operation, said system comprising:
   a base plate coupled to a wall of said slurry flow chamber and having a first side and a second side;
   a filter having pores of a predetermined diameter configured to extract a portion of said slurry flowing through said slurry flow chamber, configured to filter said portion of said slurry to produce a filtered slurry, and configured to pass a first portion of said filtered slurry back to said slurry flow chamber, and having a first end and a second end, wherein said first end is coupled to said base plate upon said first side;

an end plate coupled to said second end;

a filter chamber encompassed by said filter and configured to contain said filtered slurry;

a purge piston configured to reside within said filter chamber in one of a first position proximate said first end and a second position proximate said second end;

a shaft coupled to said purge piston proximate said first side;

a bidirectional ram coupled to said shaft proximate said second side;

an inlet pipe coupled to said filter chamber;

a flush valve coupled into said inlet pipe;

a controller electrically coupled to said bidirectional ram and said flush valve;

an outlet pipe coupled to said filter chamber and configured to pass a second portion of said filtered slurry, the inner diameter of said outlet pipe being substantially twice said predetermined diameter; and a monitoring device coupled into said outlet pipe and configured to monitor said density of said second portion of said filtered slurry.

22. A slurry-density monitoring system as claimed in claim 21 wherein, during said monitor operation:

said flush valve maintains a closed condition;

said bidirectional ram maintains said purge piston in said first position;

a portion of said slurry in said slurry flow chamber passes through said filter to become said filtered slurry;

a portion of said filtered slurry passes into said outlet pipe; and said monitoring device monitors said portion of said filtered slurry to determine a density thereof.

23. A slurry-density monitoring system as claimed in claim 21 wherein said filter chamber comprises:

an inner compartment, being that portion of said filter chamber between said purge piston and said base plate; and an outer compartment, being that portion of said filter chamber between said purge piston and said end plate.

24. A slurry-density monitoring system as claimed in claim 23 wherein, during said purge operation:

said controller instructs said flush valve to assume an open condition;

said inlet pipe passes water from a water source into said inner compartment;

said controller instructs said bidirectional ram to transit said purge piston from said first position to said second position; and said purge piston forces a portion of said filtered slurry within said outer compartment to pass though said filter and into said slurry flow chamber during transit of said purge piston.

25. A slurry-density monitoring system as claimed in claim 24 wherein said portion of said filtered slurry forced to pass through said filter is a majority of said filtered slurry within said outer compartment.

26. A slurry-density monitoring system as claimed in claim 24 wherein, during said purge operation, said purge piston forces a portion of said filtered slurry within said outlet pipe to pass into said inner compartment during transit of said purge piston.

27. A slurry-density monitoring system as claimed in claim 23 wherein, during said purge operation:

said flush valve maintains an open condition;

said bidirectional ram maintains said purge piston in said second position;

said inlet pipe passes water from a water source into said inner compartment; and said water dilutes said filtered slurry within said inner compartment.

28. A slurry-density monitoring system as claimed in claim 23 wherein, during said purge operation:

said controller instructs said flush valve to assume a closed condition;

said controller instructs said bidirectional ram to transit said purge piston within said filter chamber from said second position to said first position;

said purge piston forces a portion of a diluted slurry within said inner compartment to pass though said filter and into said slurry flow chamber during transit of said purge piston; and a portion of said slurry in said slurry flow chamber passes through said filter to become a filtered slurry within said outer compartment.

29. A slurry-density monitoring system as claimed in claim 28 wherein said portion of said diluted slurry is a first portion, and wherein, during said purge operation:

said purge piston forces a second portion of said diluted slurry to pass into said outlet pipe during transit of said purge piston; and said second portion of said diluted slurry purges said outlet pipe and said monitoring device.

30. A slurry-density monitoring system as claimed in claim 21 wherein:

said controller determines a monitor time, being a period of time during which said system effects said monitor operation between repeated ones of said purge operations;

said controller determines a purge time, being a period of time said system effects each of said purge operations; and said monitor time is greater than said purge time.

31. A slurry-density monitoring system as claimed in claim 30 wherein:

said monitor time is at least 1 and no more than 48 hours; and said purge time is at least 1.5 and no more than 5 seconds.

* * * * *